US010637958B1

(12) United States Patent
Akkala et al.

(10) Patent No.: US 10,637,958 B1
(45) Date of Patent: Apr. 28, 2020

(54) SUPPORTING COMPLEX ARRAYS IN A DATA-DRIVEN USER INTERFACE

(71) Applicant: VMware, Inc., Palo Alto, CA (US)

(72) Inventors: Sarmishta Akkala, Sandy Springs, GA (US); Colleen Caporal, Johns Creek, GA (US); Bhavesh Krishna Kumar, Atlanta, GA (US); Eric Matthew Stillman, Cumming, GA (US); Adarsh Subhash Chandra Jain, Roswell, GA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/453,247

(22) Filed: Jun. 26, 2019

(51) Int. Cl.
*H04L 29/08* (2006.01)
*G06F 3/0484* (2013.01)

(52) U.S. Cl.
CPC ........ *H04L 67/303* (2013.01); *G06F 3/04847* (2013.01); *H04L 67/34* (2013.01)

(58) Field of Classification Search
CPC .... H04L 67/303; H04L 67/34; G06F 3/04847
See application file for complete search history.

(56) References Cited

U.S. PATENT DOCUMENTS

2012/0128138 A1\* 5/2012 Williams ............ H04M 1/2478
379/93.01
2018/0102062 A1\* 4/2018 Livni .................. G09B 17/003

\* cited by examiner

*Primary Examiner* — Joseph E Dean, Jr.
(74) *Attorney, Agent, or Firm* — Clayton, McKay & Bailey, PC

(57) ABSTRACT

Systems and methods are provided for an improved GUI workflow that supports complex bundle arrays for configuring devices. The method can also include displaying, on a GUI, a first top-level array of configuration fields described in a schema file having configuration options for a user device. A top-level array can include at least one group of nested (or "lower-level") configuration options, where the grouping is represented by a graphical element in the top-level array. In response to a selection of a second-level array, the example method can include extracting lower-level configuration information from the schema file, generating a lower-level array based on the extracted information, and displaying, within the first top-level array, the first lower-level array of configuration fields. The method can also include various options for copying stored settings into a new array. The settings can be implemented on a device through a management server.

20 Claims, 8 Drawing Sheets

SUPPORTING COMPLEX ARRAYS IN A DATA-DRIVEN USER INTERFACE

BACKGROUND

Configuring device and application settings across a number of devices in an enterprise setting can be cumbersome and inefficient. Typically, an administrator within an enterprise uses a Mobile Device Management ("MDM") or Enterprise Mobility Management ("EMM") system (collectively, "EMM systems") to support and configure devices across an enterprise.

Historically, application developers created custom software development kits ("SDKs") to enable configuration of their applications through EMM systems. While these SDKs provide access to configuration and management features, they also require time-consuming work on the EMM-provider side to adapt an EMM system such that it can configure the customized aspects provided by the SDK.

More recently, some application developers and original equipment manufacturers ("OEMs") have begun using application-configuration ("app-config") applications that standardize certain actions across different types of devices. For example, a company such as SAMSUNG can release an app-config application that allows an EMM system to configure certain features on a SAMSUNG device, such as restricting camera access based on the device's geographic location. The EMM system can instruct the app-config application on the device to implement settings made available by the application. Because the configuration options can be standardized across different devices and OEMs, the configuration process on the EMM-provider side can be substantially streamlined. The EMM provider can obtain a blueprint, or "schema file," containing the various configuration options available in a particular app-config application. This can allow the EMM provider to design an interface that an administrator can use to view and select the available configurations.

App-config applications continue to grow in complexity, presenting new workflow problems for EMM providers attempting to access the various configuration options. For example, newer app-config applications provide options for complex or nested configurations. These configurations can have one or more levels, with each level including more granular detail that is "nested" within a broader configuration option. Existing workflows do not provide the flexibility to allow an administrator to take advantage of these nested options. Additionally, the existing workflows lack adequate extensibility, requiring extensive reworking when newer, deeper configuration options are released by an OEM or developer.

As a result, a need exists for an improved interface for configuring devices, such as by supporting complex arrays in a data-driven user interface ("DDUI" or "GUI").

SUMMARY

Examples described herein include systems and methods for providing an improved GUI workflow that supports complex bundle arrays for configuring devices. In an example method, a management server can receive a schema file from an application repository. The schema file can include configuration options for a user device based on the device type. For example, the schema file can describe options for an app-config application for an OEM. The example method can also include storing the schema file in a database accessible to the management server.

The method can also include displaying, on a GUI, a first top-level array of configuration fields described in the schema file. A top-level array can include at least one group of nested (or "lower-level") configuration options, where the grouping is represented by a graphical element in the top-level array. The graphical element can be displayed in a "closed" state such that the nested configuration options themselves are not shown—instead, a graphical element corresponding to the grouping itself is shown. In the example method, when a user selects a first graphical element corresponding to a first of the second-level arrays, the system can perform various tasks.

For example, in response to a selection of a second-level array, the example method can include extracting, by a management server, lower-level configuration information from the schema file. The extraction can be done using the same schema file or a file that was updated since the first top-level array was displayed. The example can also include generating a lower-level array based on the extracted configuration information. Further, the example can include displaying, within the first top-level array, the first lower-level array of configuration fields. The lower-level array can include the extracted configuration information.

The example method can also include receiving user input at a data field within the lower-level array displayed on the GUI. The method can further include sending, from the management server to the user device, settings to be applied to the user device. These settings can reflect the user input at the data field of the lower-level array. The settings can be applied by an app-config application executing on the user device, for example.

The example method can also include additional options for streamlining the GUI workflow. For example, a user may want to copy a first lower-level array to a second lower-level array while also transferring any previous selections made within the first lower-level array. The method can therefore include receiving, at the GUI, a user selection of a copy element corresponding to the first lower-level array. In response to this selection, the system can generate a second lower-level array having configuration fields matching the configuration fields of the first lower-level array. The system can also retrieve, from the database, a file describing entries in the configuration fields of the first lower-level array. The file can be a JSON file, for example. The system can then automatically input the entries from the retrieved file into the configuration fields of the second lower-level array.

A similar example is provided for copying top-level arrays. The example method can include receiving, at the GUI, a user selection of a copy element corresponding to the first top-level array. In response to receiving that selection, the system can generate a second top-level array having configuration fields matching the configuration fields of the first top-level array. Additionally, the second top-level array can include its own lower-level array, referring to as the third lower-level array in this example. The third lower-level array can match the configuration fields of the first lower-level array, even though the two lower-level arrays are nested in different top-level arrays. The example method can also include retrieving a file describing entries in the configuration fields and automatically inputting those entries into the fields of the second top-level array (including automatically inputting entries into the third lower-level array).

The example method can also include retrieving an updated schema file from an application repository and dynamically updating the GUI to reflect the updated schema file. In some examples, the system checks for a new schema file before rendering a new portion of the GUI, such as when expanding a lower-level array selected by a user. In other examples, the fields of an array are updated as soon as a new schema file is received and processed.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for providing an improved GUI workflow that supports complex bundle arrays for configuring devices. In an example method, a management server can receive a schema file from an application repository. The schema file can include configuration options for a user device based on the device type. For example, the schema file can describe options for an app-config application for an OEM. The method can also include displaying, on a GUI, a first top-level array of configuration fields described in the schema file. A top-level array can include at least one group of nested (or "lower-level") configuration options, where the grouping is represented by a graphical element in the top-level array.

In response to a selection of a second-level array, the example method can include extracting lower-level configuration information from the schema file. The extraction can be done using the same schema file or a file that was updated since the first top-level array was displayed. The example can also include generating a lower-level array based on the extracted configuration information. Further, the example can include displaying, within the first top-level array, the first lower-level array of configuration fields. The lower-level array can include the extracted configuration information. The example method can also include receiving user input at a data field within the lower-level array displayed on the GUI. It can also include various options for copying stored settings into a new array, thereby avoiding the need to reconfigure each option to match a previous configuration when, for example, only one small change may be desired.

The method can further include sending, from the management server to the user device, settings to be applied to the user device. These settings can reflect the user input at the data field of the lower-level array. The settings can be applied by an app-config application executing on the user device, for example.

Figure 1:
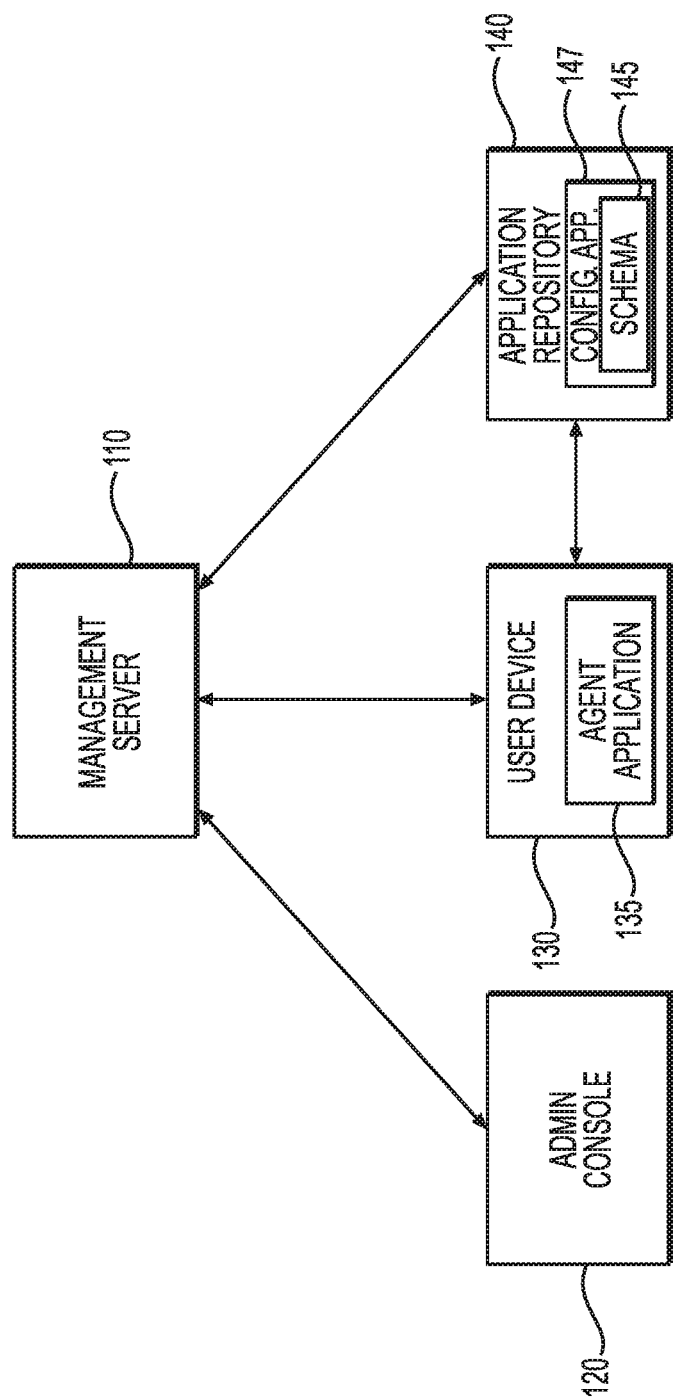
FIG. 1 is an illustration of a system for providing a user interface that supports complex arrays of configuration information for configuring user devices.

FIG. 1 provides an illustration of a system for carrying out the various methods described herein. The system can include a management server 110, an administrator console 120, one or more managed user devices 130, and an application repository 140. Management server 110 can include multiple servers, processors, and computing devices. In some examples, management server 110 is a network of servers, some of which can be located remotely from one another. In another example, management server 110 is a single server with multiple purposes. In yet another example, management server 110 is a server (or group of servers) dedicated to the operations described herein.

Management server 110 can be communicatively coupled to administrator console 120 via a network, such as the internet. An administrator can utilize console 120 to configure device settings and compliance rules to be applied to one or more of the managed user devices 130. This can be accomplished using a GUI displayed at console 120 (described in more detail below and with respect to FIGS. 4-8). The administrator can access console 120 by, for example, navigating to a web location using a web browser on a computing device or accessing a standalone application on a computing device.

The application repository 140 can store an application-configuration application ("app-config application") 147 that can be used to configure settings on a device. The application repository 140 can be managed by a third party, such as the APPLE APP STORE or the GOOGLE PLAY STORE. In some examples, the app-config application 147 is developed by an OEM for configuring devices manufactured by that OEM. The app-config application 147 can be downloaded to a user device 130 and used to configure settings on that device. For example, the app-config application 147 can include functionality for controlling various functionality on the user device 130, such as controlling functionality related to BLUETOOTH, camera, WIFI, display, bug reporting, networking, messaging, GPS, and any other relevant functionality. The app-config application 147 can provide control over these functions using standardized instructions, such as API calls, from the management server 110.

A schema file 145 can describe the various functions that can be controlled by the app-config application 147. For example, the schema file 145 can be a JSON file having fields corresponding to available configurations in the app-config application 147. The schema file 145 can include nested fields, such that configuration options are grouped into multiple levels. For example, a top-level option can correspond to WIFI, including an option to allow WIFI on the device. A nested option within the WIFI category can relate to WIFI calling, available only if WIFI is enabled. Further options can be nested within the WIFI calling group, such as options allowing WIFI calling only when the user device 130 is located in a particular geographic area.

The schema file 145 can be provided to the management server 110 without requiring the management server 110 to download the app-config application 147 itself. For example, the management server 110 can request the schema file 145 from the application repository 140 and download it directly. The management server 110 can then allow an administrator to configure options available in the schema file 145, using the administrator console 120. The management server 110 can then instruct an agent application 135, executing on the user device 130, to implement configurations using an app-config application 147 downloaded to the user device 130.

User devices 130 can include any computing device that includes a processor and a memory store, including a laptop or desktop computer, phone, tablet, or watch. Like administrator console 120, user devices 130 can be communicatively coupled to management server 110 and application repository 140 via a network, such as the internet.

In some examples, user devices 130 include an agent application 135 residing on the device. Agent application 135 can be a portion of an operating system for user device 130, or it can operate in the application layer of the user device 130. The agent application 135 can be a dedicated application or other software installed on user device 130 that can monitor and control device settings, hardware components, and other applications installed on the user device 130. In some examples, the agent application 135 is a multi-purpose application that includes an agent functionality. For example, the multi-purpose application can provide access to corporate materials, such as through single-sign-on functionality, while also including agent functionality. These various permutations are generically referred to as an "agent" or "agent application" throughout.

To deploy the desired device settings received from administrator console 120 across one or more user devices 130 identified by the administrator, management server 110 can send instructions to each of user devices 130 to download the app-config application 147 from application repository 140, if it has not done so already. Device management server 110 can also send the device settings information received from administrator console 120 to the user devices 130. Specifically, the device settings information can be transmitted to agent application 135 residing on each user device 130. After app-config application 147 is installed at a user device 130, agent application 135 can apply the device settings information to the app-config application 147. In either case, the device settings configured by the administrator can be applied to each user device 130 automatically, without the administrator needing to manually identify app-config application 147 or provide instructions for downloading it.

In this manner, the administrator is able to fully configure every device setting made available by the device manufacturer through administrator console 120 without requiring any specific knowledge of app-config application 147, schema file 145, or how schema 145 is used to construct the GUI at console 120. In fact, the administrator need not be aware that app-config application 147 or schema file 145 exist or are necessary to the device settings configuration process.

Additionally, when a device manufacturer makes a new feature available for configuration, there is no need for software updates at administrator console 120, management server 110, or agent application 135 of user device 130. Rather, the administrator can simply create a new profile (or edit an existing one) and identify the relevant device type. The management server 110 can automatically retrieve the latest schema file 145 from application repository 140. The latest schema file would include information necessary for management server 110 to generate a GUI to be displayed at administrator console 120, including all available fields or elements for configuring the available device features, including any new ones. The remainder of the deployment process can then proceed as described above.

Even in an instance when the app-config application 147 requires an update before the newly released feature is available to the user devices 130, that information can be contained in schema 145 and management server 110 can transmit an instruction to each identified user device 130 to download the latest version of the app-config application 147 prior to agent application 135 implementing the new settings at device 130. The management server 110 can download updated versions of the schema file 145 at any time, including while an administrator is interacting with the console 120, thereby providing a dynamic GUI for configuring user devices 130.

Figure 2:
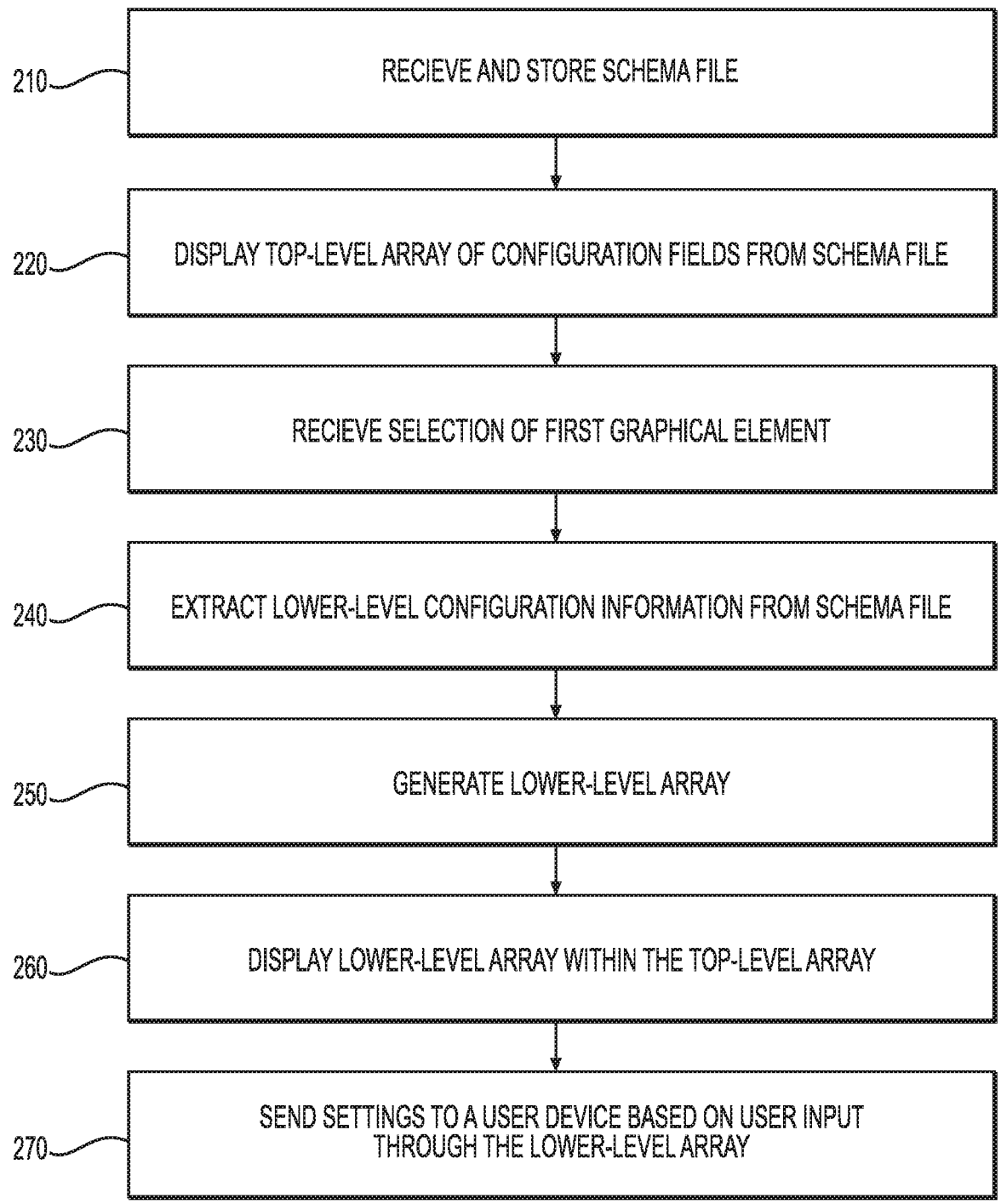
FIG. 2 is a flowchart of an example method for providing a user interface that supports complex arrays of configuration information for configuring user devices.

FIG. 2 provides a flowchart of an example method for providing a GUI that supports complex arrays of configuration information for configuring user devices. Stage 210 of the method can include receiving and storing the schema file 145. As part of this stage, the management server 110 can request a schema file 145 from the application repository 140. The request can be an application programming interface ("API") call, for example. The request can identify an app-config application 147 corresponding to the desired schema file 145. For example, the application repository 140 can include separate app-config applications 147 for different OEMs, such as SAMSUNG, HTC, and NOKIA. The request to the application repository 140 can therefore request a schema file 145 corresponding to a specific app-config application 147.

The request can be made regardless of whether the management server 110 has already received an earlier version of the schema file 145. For example, the management server 110 can make the request in order to confirm that the schema file 145 has not been updated since a previous request was made. In some examples, the application repository 140 can indicate whether the schema file 145 has been updated since previously being sent to the management server 110. This can be performed by, for example, providing a response to the management server 110 that does not include a new schema file 145 and instead indicates that no update has occurred. In other example, the application repository 140 can provide the most current schema file 145 without regard for the previous versions provided to the management server 110, and the management server 110 can determine whether any changes have been made and utilize the schema file 145 accordingly.

As part of stage 210, the management server 110 can store the schema file 147 in a database accessible to the management server 110. The database can be a storage location attached to the management server 110, for example. In another example, the database is a distributed storage system that spans multiple computing devices. The storage location can be remote from the management server 110 in some examples.

At stage 220, the administrator console 120 can display a GUI for configuring device settings. The GUI can be displayed on the console 120 using a web browser application, for example. In other examples, the GUI can be displayed on the console 120 using a dedicated application for configuring device settings. The GUI can include at least one top-level array of configuration fields. The configuration fields in the top-level array can be configuration options from the schema file 145 corresponding to top-level configuration options. In some examples, a top-level configuration option can be a group, or category, of multiple options. For example, a top-level configuration option can correspond to WIFI settings. The GUI can therefore display a graphical element corresponding to the top-level configuration option for WIFI settings.

The GUI can also display graphical elements corresponding to other top-level configuration options. As an example, a second graphical element can correspond to a top-level configuration option for camera settings. Together, these multiple top-level configuration options can be considered an array, or more specifically, a top-level array. This array can be displayed on the GUI at stage 220 of the example method.

Multiple lower-level configuration options can be nested within a top-level configuration option. Using WIFI settings as an example top-level configuration option, multiple options relating to WIFI can be nested within that option. For example, the lower-level options can relate to (1) restricting WIFI access based on geolocation, (2) disabling WIFI calling based on battery level, and (3) requiring certain credentials to connect to certain WIFI access points.

These lower-level configuration options can be extracted from the schema file 145. In some examples, lower-level configuration information is extracted based on the GUI receiving a selection of a first graphical element of the GUI at stage 230. The first graphical element of the GUI can be a graphical element representing a group of lower-level configuration options, such as a graphical element corresponding to "WIFI configuration." The first graphical element can be displayed in a condensed form, such that the user clicks on the element to expand it. This click can be considered a selection at stage 230.

At stage 240, the lower-level configuration information can be extracted from the schema file 145. For example, the schema file 145 can describe the categories of configuration options within the category of "WIFI configuration." Using the previous example, those categories can correspond to (1) restricting WIFI access based on geolocation, (2) disabling WIFI calling based on battery level, and (3) requiring certain credentials to connect to certain WIFI access points. The extraction at stage 240 can be performed by the management server 110 in some examples.

The management server 110, in turn, generate the lower-level array at stage 250 and cause the administrator console 120 to display the relevant graphical elements corresponding to the categories described in the lower-level configuration information at stage 260. These stages can include providing an instruction to the administrator console 120 with information regarding the lower-level options to be displayed, along with sufficient instruction for the console 120 to generate appropriate graphical elements for each. For example, each of the three lower-level options described above can be implicated by a separate graphical element in the GUI. Each graphical element can be a standalone element. Each of the graphical elements can include, for example, a plus sign indicating expandability, a drop-down menu for selecting between multiple options, and a data field for manually entering data. The graphical elements of the lower-level array can be displayed within the top-level array, such as by positioning the relevant graphical elements underneath a graphical element corresponding to the relevant top-level array. The graphical elements can also be positioned to indicate whether those elements correspond to the top-level array or the lower-level array.

At stage 270, the management server 110 can send settings a user device 130 based on user input through the lower-level array. Using the same example as above, the user can make a selection for a lower-level configuration option corresponding to restricting WIFI access based on geolocation. For example, the user can select an option for always allowing WIFI regardless of geolocation. In some examples, the selection of the GUI option is automatically communicated to the management server 110. In other examples, the selection is communicated to the management server 110 after the user selects an option for saving the selection.

In either case, the management server 110 can receive the selection, generate an instruction for a relevant user device 130, and transmit the instruction to the user device 130. The instruction can also include instructions for downloading an app-config application 147 at the user device 130 corresponding to the manufacturer of the user device 130. The instruction can further instruct an agent 135 on the user device 130 to implement the relevant settings in the app-config application 147. For example, the agent 135 can be instructed to configure a setting within the app-config application 147 such that WIFI is allowed regardless of geolocation, based on the user's input through the GUI.

Figure 3:
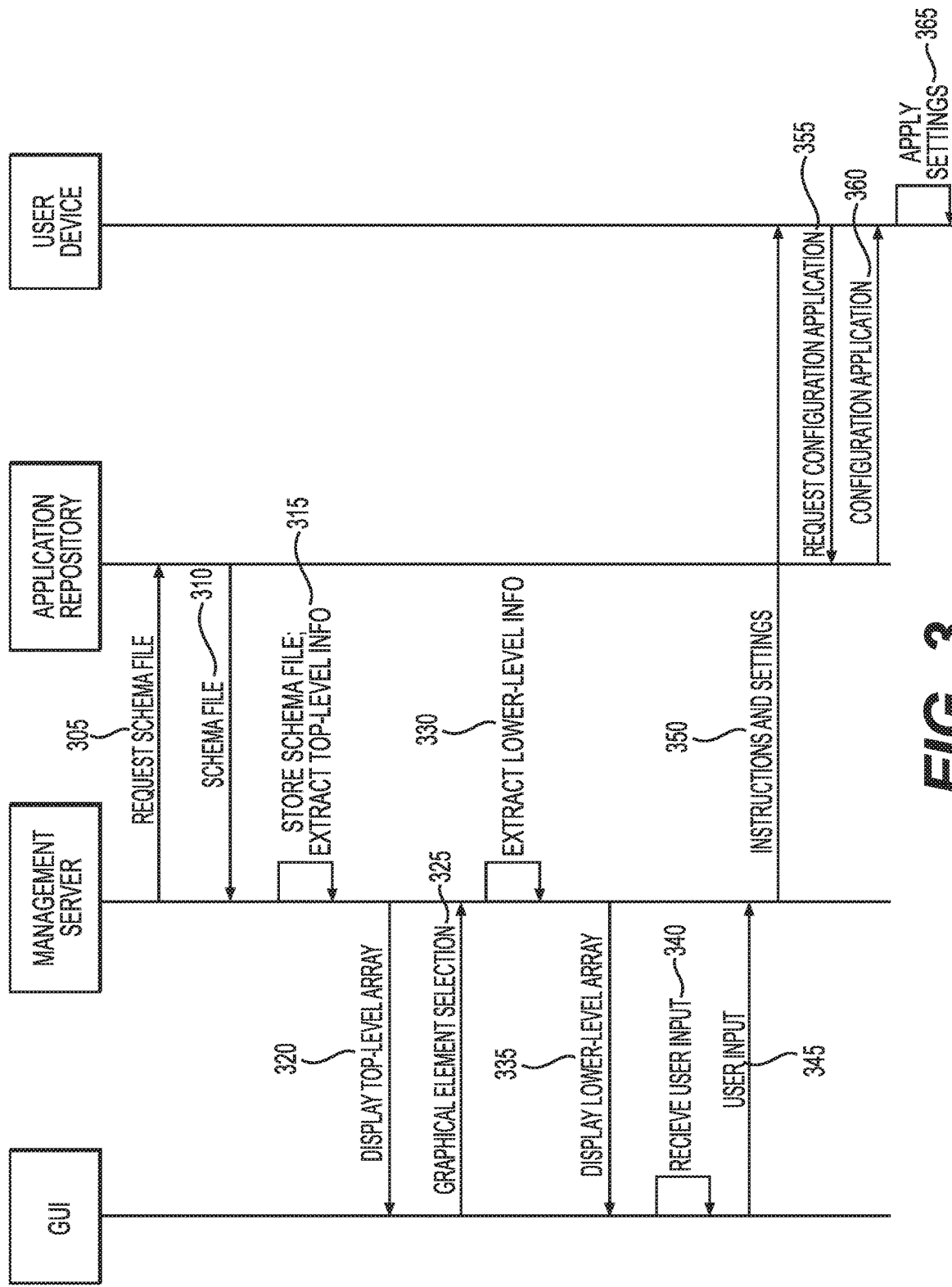
FIG. 3 is a sequence diagram of an example method for providing a user interface that supports complex arrays of configuration information for configuring user devices.

FIG. 3 provides a sequence diagram of an example method for providing a GUI that supports complex arrays of configuration information for configuring user devices. At stage 305, the example method can include requesting a schema file 145 from an application repository 140. The request can take any form, such as an API call made from the management server 110 to the application repository 140. As explained above, the application repository 140 can be an application store managed by a third party, such as the APPLE APP STORE or the GOOGLE PLAY STORE. But the application repository 140 can also be managed by the management server 110 in some examples.

The request to the application repository 140 can request a schema file 145 relating to an app-config application 147. As mentioned previously, the app-config application 147 can be an application developed by an OEM for configuring devices manufactured by that OEM. The app-config application 147 can be downloaded to a user device 130 and used to configure settings on that device. For example, the app-config application 147 can include functionality for controlling various functionality on the user device 130, such as controlling functionality related to BLUETOOTH, camera, WIFI, display, bug reporting, networking, messaging, GPS, and any other relevant functionality. The app-config application 147 can provide control over these functions using standardized instructions, such as API calls, from the management server 110.

In some examples, the management server's 110 request identifies a particular app-config application 147 and requests the schema file 145 pertaining to that application. In other examples, the request identifies an OEM and requests a schema file 145 offered by that OEM. The schema file 145 can be downloaded from the application repository 140 to the management server at stage 310.

At stage 315, the management server 110 can store the schema file 145 in a memory storage location. The storage location can be a database available to the management server 110, either as part of the physical server 110 or as part of one or more remote devices. For example, the storage location can be a distributed database that is distributed across multiple devices and managed through virtualized networks and controllers. The terms "database," "memory storage," and "storage" are used interchangeably herein and are intended to cover all relevant storage options.

Stage 315 can also include extracting information from the schema file 145. In one example, all information from the schema file 145 is extracted and saved as a separate file usable by the GUI, such as a JSON file. In another example, only the top-level configuration information is extracted from the schema file 145. The top-level configuration information can include all information necessary to display a top-level array on the GUI. This can include, for example, titles, headings, data fields, drop down menus, words, and images associated with the top-level array. The information can also include lower-level categories, and associated graphical elements, to be displayed within the top-level array. As explained further in FIGS. 4-8, the top-level array can include graphical elements corresponding to lower-level categories, such that a user can select a category to expand a lower-level array and access any configuration options nested within.

At stage 320, the management server 110 can cause the GUI to display a top-level array. The GUI can be displayed on the console 120 using a web browser application, for example. In other examples, the GUI can be displayed on the console 120 using a dedicated application for configuring device settings. The GUI can include at least one top-level array of configuration fields. The configuration fields in the top-level array can be configuration options from the schema file 145 corresponding to top-level configuration options. In some examples, a top-level configuration option can be a group, or category, of multiple options. For example, a top-level configuration option can correspond to camera settings. The GUI can therefore display a graphical element corresponding to the top-level configuration option for camera settings, for example.

At stage 325, the management server 110 can receive a user selection of a graphical element selection. The selection can be, for example, a user selecting an element corresponding to a lower-level category for the purpose of expanding out the configuration options within that lower-level category. The GUI selection can be received at the administrator console 120 and communicated from the administrator console 120 to the management server 110.

In response to receiving the graphical element selection at stage 325, the management server 110 can extract relevant lower-level configuration information from the schema file 145 at stage 330. This can include, for example, extracting additional information from the schema file 145 and saving it as a separate file usable by the GUI, such as a JSON file. In another example where the entire schema file 145 was extracted earlier at stage 315, stage 330 can include retrieving the relevant extracted information. In some examples, the configuration information is extracted by the management server 110 each time a new display on the GUI is called for, allowing the management server 110 to access the latest version of the schema file 145. That way, if the schema file 145 is changed or updated between the extractions at stage 315 and 330, the management server 110 can still capture the most up-to-date version.

The management server 110 can then cause the GUI to display the most up-to-date version of the relevant lower-level array at stage 335. The configuration fields in the lower-level array can be configuration sub-options from the schema file 145 corresponding to lower-level configuration options. In some examples, a lower-level configuration option can be a group, or category, of multiple options. For example, a lower-level configuration option can correspond to geographic locations where camera functionality is disabled. The GUI can therefore display a graphical element corresponding to the lower-level configuration option for geographic camera settings, for example.

Input can be received from the user at stage 340. The input can include, for example, the selection of a sub-group of configuration options within the lower-level options, the selection of an item from a drop-down menu, the entry of text into a data field, or the selection of a checkbox or button. This input can be communicated to the management server 110 from the administrator console 120 at stage 345.

The management server 110, in turn, can process the selection and provide corresponding instructions and settings to one or more user devices 130 at stage 350. For example, the selection can limit camera functionality while any of a group of user devices 130 is located in a geofenced office area. The management server 110 can receive that selection and generate instructions for deploying that selection across the relevant devices. The instructions can include, for example, ensuring that a device 130 has a relevant app-config application 147 installed and instructing an agent 135 on the device 130 to configure that app-config application 147 to match the input received at stage 345.

Having received the instructions from the management server 110, the user device 130 can first ensure that the most recent version of the relevant app-config application 147 is installed on the device 130. To accomplish this, the user device 130 can request the latest version of the app-config application 147 from the application repository 140 at stage 355. The application repository 140 can transmit the latest version of the app-config application 147 to the user device 130 at stage 360. Alternatively, the application repository 140 can confirm that the user device 130 already has the latest version of the app-config application 147 installed at this stage.

At stage 365, the user device 130 can apply the relevant settings using the app-config application 147. For example, an agent 135 on the user device 130 can provide instructions to the app-config application 147 based on the instructions received at stage 350. The instructions can instruct the app-config application 147 to implement settings that match the settings selected by the administrator at the console 120. In some examples, more than one user device 130 can be instructed to implement these settings based on a single input, or set of inputs, from the administrator.

FIGS. 4-8 provide illustrations of example GUI views that can correspond to various stages described above. The drawings are provided in an order that tracks an example workflow that an administrator can use to configure user devices 130 in the manner described previously.

Figure 4:
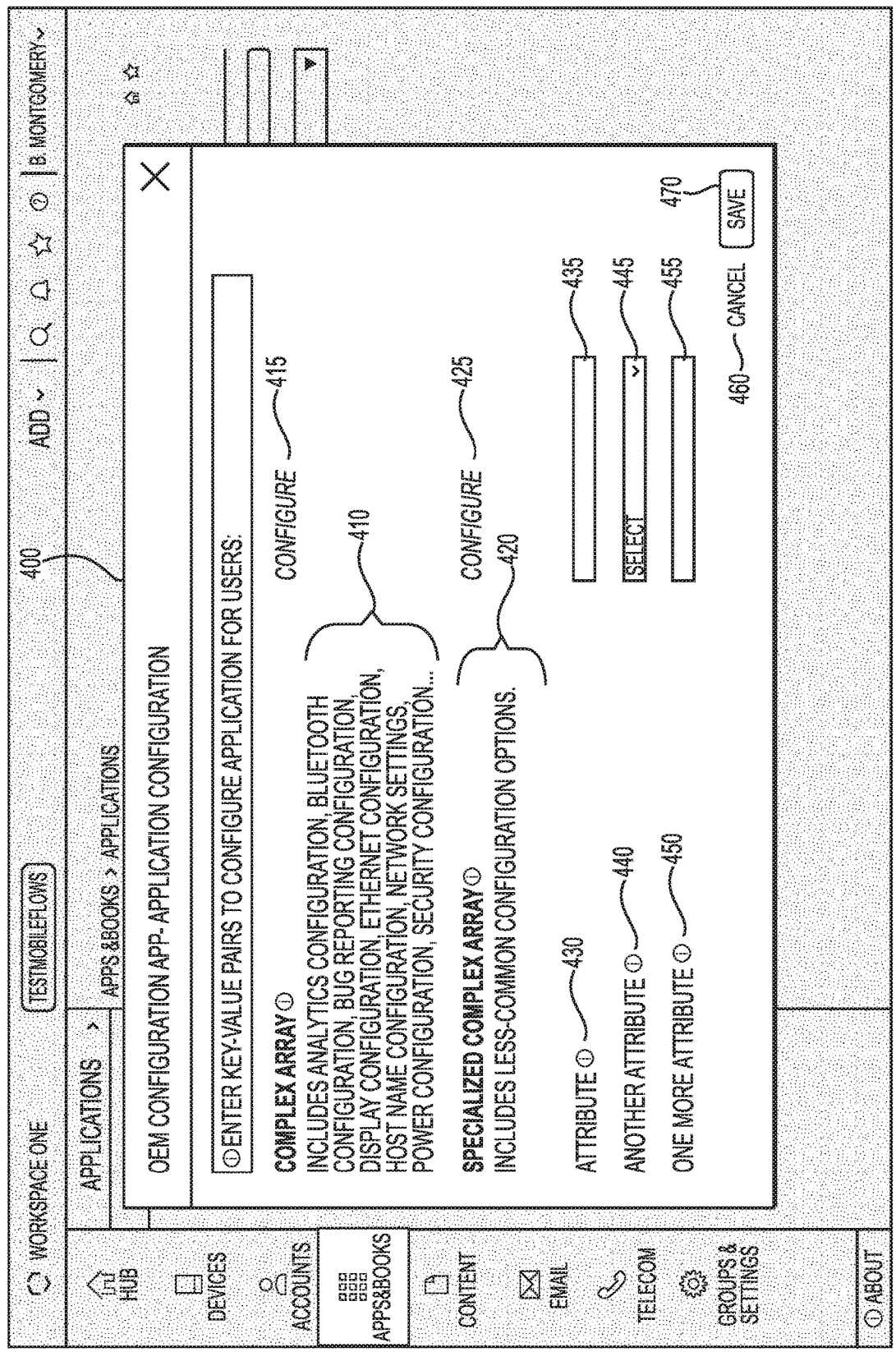
FIG. 4 is an illustration of an example GUI that supports complex arrays of configuration information for configuring user devices.

FIG. 4 provides a GUI page 400 that can be displayed at the administrator console 120. The GUI page 400 can function as a landing page for configuring an OEM configuration application, such as the app-config application 147 discussed previously. A text element 410 is provided on the GUI page 400. The text element 410 includes a description of a complex array, including the types of configuration options that can be available by way of the complex array. The text element 410 can also include an information button, depicted as the letter "i" with a circle around it, that displays a pop-up screen with additional information upon selection. A "configure" button 415 is positioned proximate the text element 410, such that an administrative user can simply select the button 415 to configure a complex array.

The GUI page 400 also includes a text element 420 relating to a specialized complex array, which can be a complex array relating to configuration options that are less-commonly used—for example, options that relate to a specialized types of devices such as so-called "rugged devices" used in retail stores. The text element 420 can include a text description as well as an information button. A configure button 425 is provided alongside the text element 420, such that an administrative user can select the button 425 to configure a specialized complex array.

Additionally, various attribute elements 430, 440, 450 are included in GUI page 400. Each attribute element 430, 440, 450 can include a corresponding field element 435, 445, 455. The field elements 435, 445, 455 can be used to specify one or more devices 130 to which the configuration settings will be applied. For example, an administrative user can enter attributes relating to relevant user devices 130, such as device ID numbers, device manufacturers, user IDs, organizational groups to which a user belongs, and any other attributes describing the user devices 130 or users of those devices 130. The field elements 435, 445, 455 can be drop-down menus or text fields, for example. The GUI page 400 can also include a cancel button 460 and a save button 470 for cancelling or saving current configurations.

Figure 5:
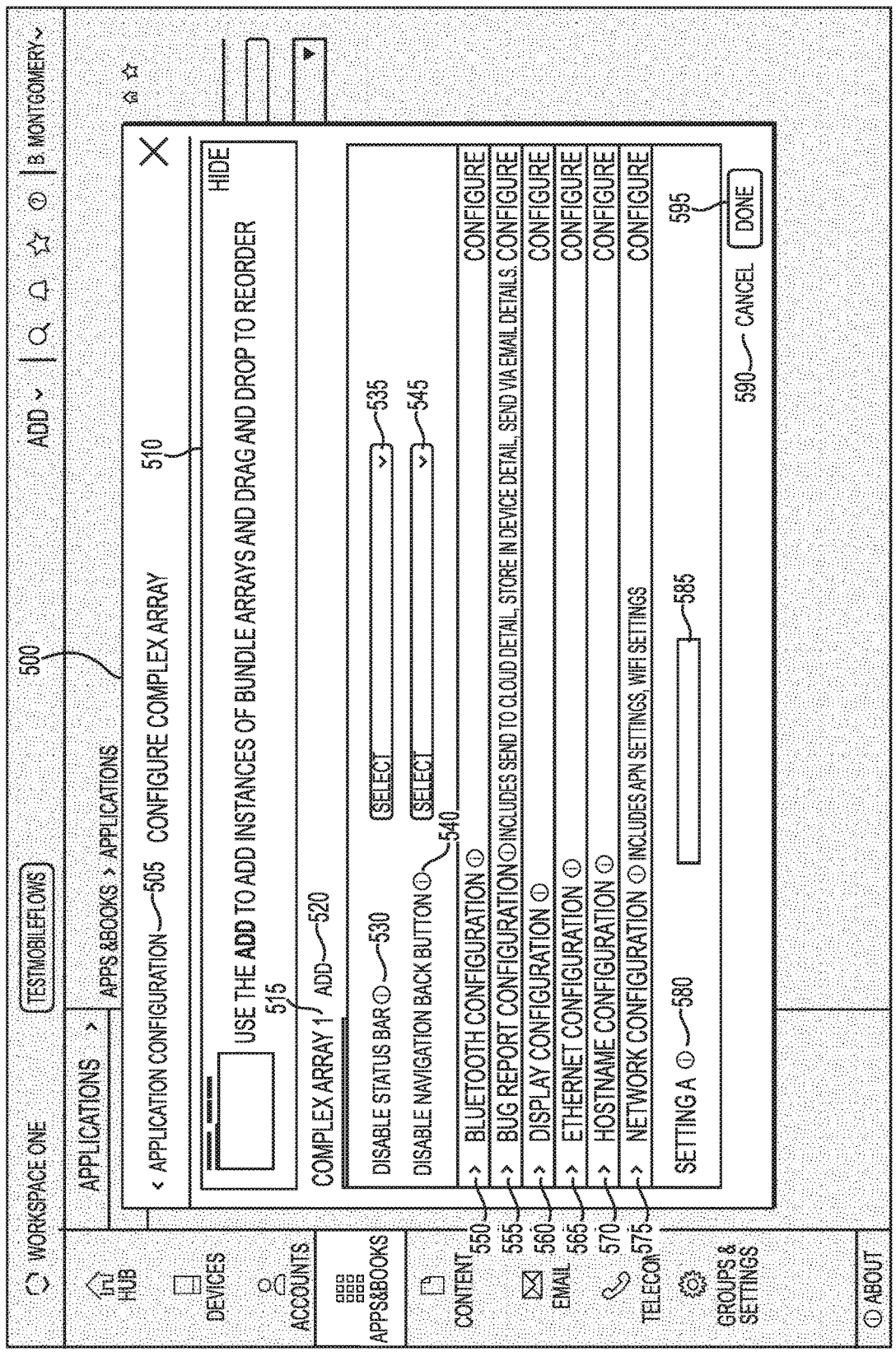
FIG. 5 is an illustration of an example GUI that supports complex arrays of configuration information for configuring user devices.

FIG. 5 provides an illustration of another GUI page 500. The GUI page 500 can be displayed based on an administrator selecting a configure element 415, 425 from FIG. 4. The GUI page 500 includes a back element 505 for returning back to the previous GUI page, which can be GUI page 400 of FIG. 4, for example. The GUI page 500 of FIG. 5 can also include a complex array 515, depicted as "Complex Array 1" in this example. The graphical elements within the box corresponding to Complex Array 1 515 (including elements 530-580) can all be considered portions of Complex Array 1 515.

An add button 520 is provided for creating a new complex array. A helpful tip 510 can be provided to alert the administrative user of the "add" functionality. This functionality is described in more detail with respect to FIG. 7. Within Complex Array 1 515, several standalone options are shown. These include options for disabling a status bar 530, disabling a navigation back button 540, and a placeholder for another setting 580. Each of these options 530, 540, 580 can have corresponding entry fields 535, 545, 585 that can be used to provide selections, either through a drop-down menu, a text field, or any or selection mechanism.

GUI page 500 also include graphical elements 550-575 that correspond to various lower-level arrays. Each of graphical elements 550-575 can correspond to a group of lower-level configuration options. Each of those elements 550-575 can also include a configure button, shown on the right in each case, that an administrative user can select to expand the lower-level array. The administrative user could also select any other option of elements 550-575 to expand the relevant lower-level array. In this example, the lower-level arrays (which are shown here in a condensed or collapsed form) relate to BLUETOOTH configuration 550, bug report configuration 555, display configuration 560, ethernet configuration 565, hostname configuration 570, and network configuration. The expansion of these elements 550-575 are described in more detail with respect to FIGS. 6 and 7. FIG. 5 can also include a cancel button 590 and a done button 595, although in this example the done button 595 is grayed out until at least one relevant selection has been made.

Figure 6:
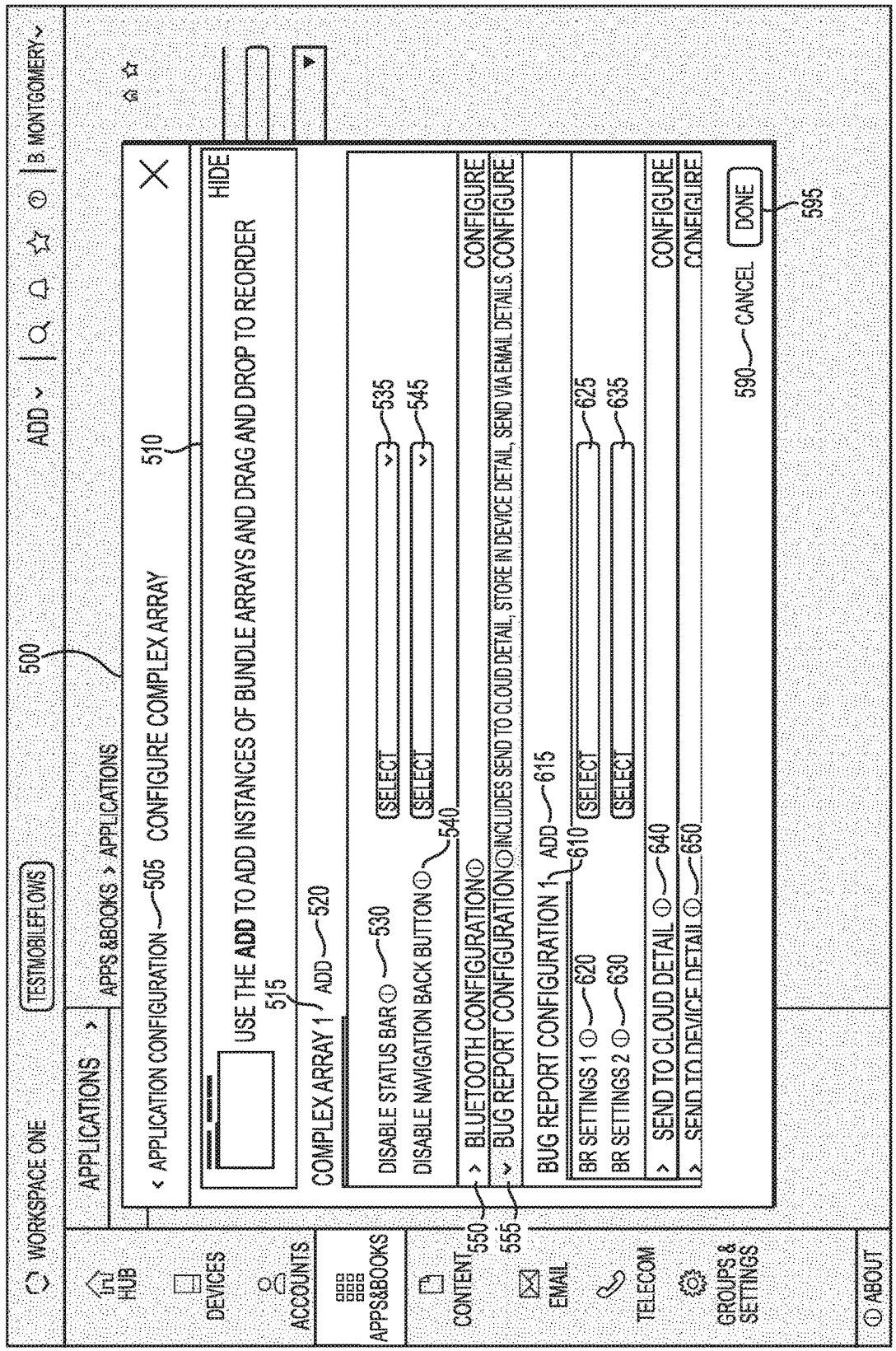
FIG. 6 is an illustration of an example GUI that supports complex arrays of configuration information for configuring user devices.

FIG. 6 shows the GUI page 500 from FIG. 5 after an administrative user has selected the bug report configuration element 555, causing a first bug-report lower-level array 610 to be expanded and displayed. The lower-level array 610 also includes an add button 615 for adding a second bug-report lower-level array, as discussed further with respect to FIG. 7 below.

Within the first bug-report lower-level array 610 depicted in FIG. 6, several standalone settings 620, 630 are shown with respective entry or selection fields 625, 634. Also shown in the lower-level array 610 are further nested arrays, which can be even-lower lower-lever arrays. For example, the "send to cloud detail" element 640 can correspond to an expandable array within the lower-level bug reporting configuration array 610. An administrative user can select the element 640 to expand the element and display any configuration options nested within that element. The user can also expand element 650, corresponding to "send to device detail," in a similar manner.

Figure 7:
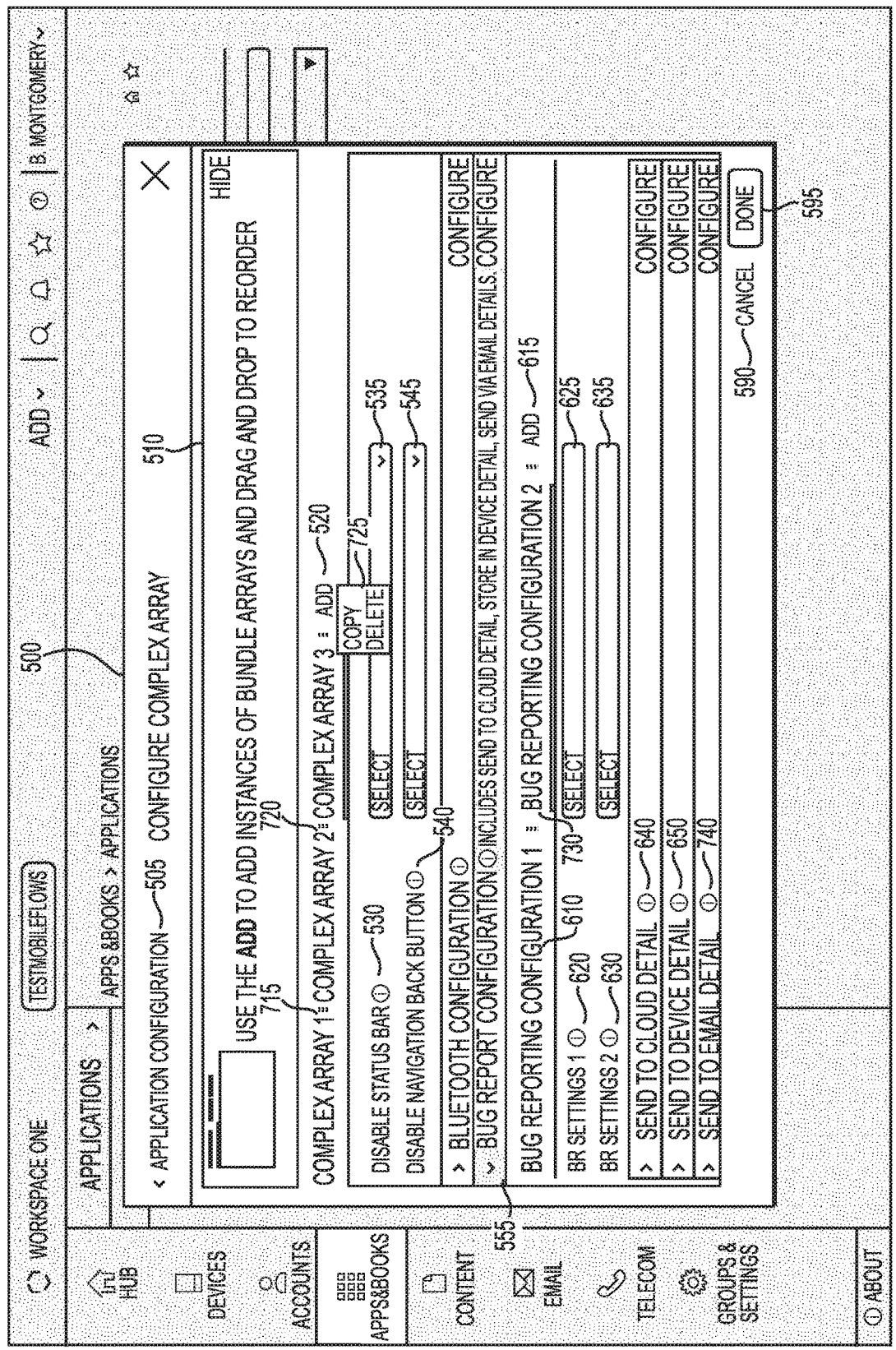
FIG. 7 is an illustration of an example GUI that supports complex arrays of configuration information for configuring user devices.

FIG. 7 shows the GUI page 500 from FIGS. 5 and 6, after an administrative user has added two more top-level arrays 715, 720 and an additional bug-reporting lower-level array 730. The top-level, or complex, arrays 715, 720 have the same configuration options nested within them, but allow an administrative user to create different arrays of settings that can apply to different devices 130 or groups of devices 130. Similarly, the second bug-reporting lower-lever array 730 includes the same configurations nested within the first lower-level array 610—though in this example a "send to email detail" element 740 is also depicted.

Both types of arrays can be added using the respective add buttons 520, 615. In some examples, an array can be copied or deleted by selecting the graphical element having three vertical dots that is depicted next to the title of each array. For example, box 725 is displayed as a result of a user selecting the three vertical dots positioned next to Complex Array 3 720. Box 725 can provide an option for copying the array and an option for deleting the array.

If a user selects to copy the array, the management server 110 can store the settings within the relevant array, cause the GUI to display a new array, and instruct the GUI to apply the same settings to that new array. In some examples, the settings within the relevant array are stored at the console 120 level rather than at the management server 110. For example, the browser that is displaying the GUI 500 can store a cookie or file that includes the settings from the relevant array. The file can be a JSON file in one example. Saving the file temporarily at the browser level can avoid the need for an additional back-and-forth between the console 120 and the management server 110, providing a quicker response for the user while utilizing less bandwidth.

In this manner, an administrative user can save time when creating a new array intended to have only minor differences from an existing array. For example, the settings of the existing array can be copied over to a new array, and the user can then go adjust any particular settings from there. This avoids the need to enter each and every setting intended to be carried over from the previous array to the new array, saving time and avoiding unnecessary errors. The same functionality can be provided for lower-level arrays, such as by selecting the three vertical dots associated with Bug Reporting Configuration 2 730, which can provide a box similar to box 725 for copying or deleting that lower-level array.

Figure 8:
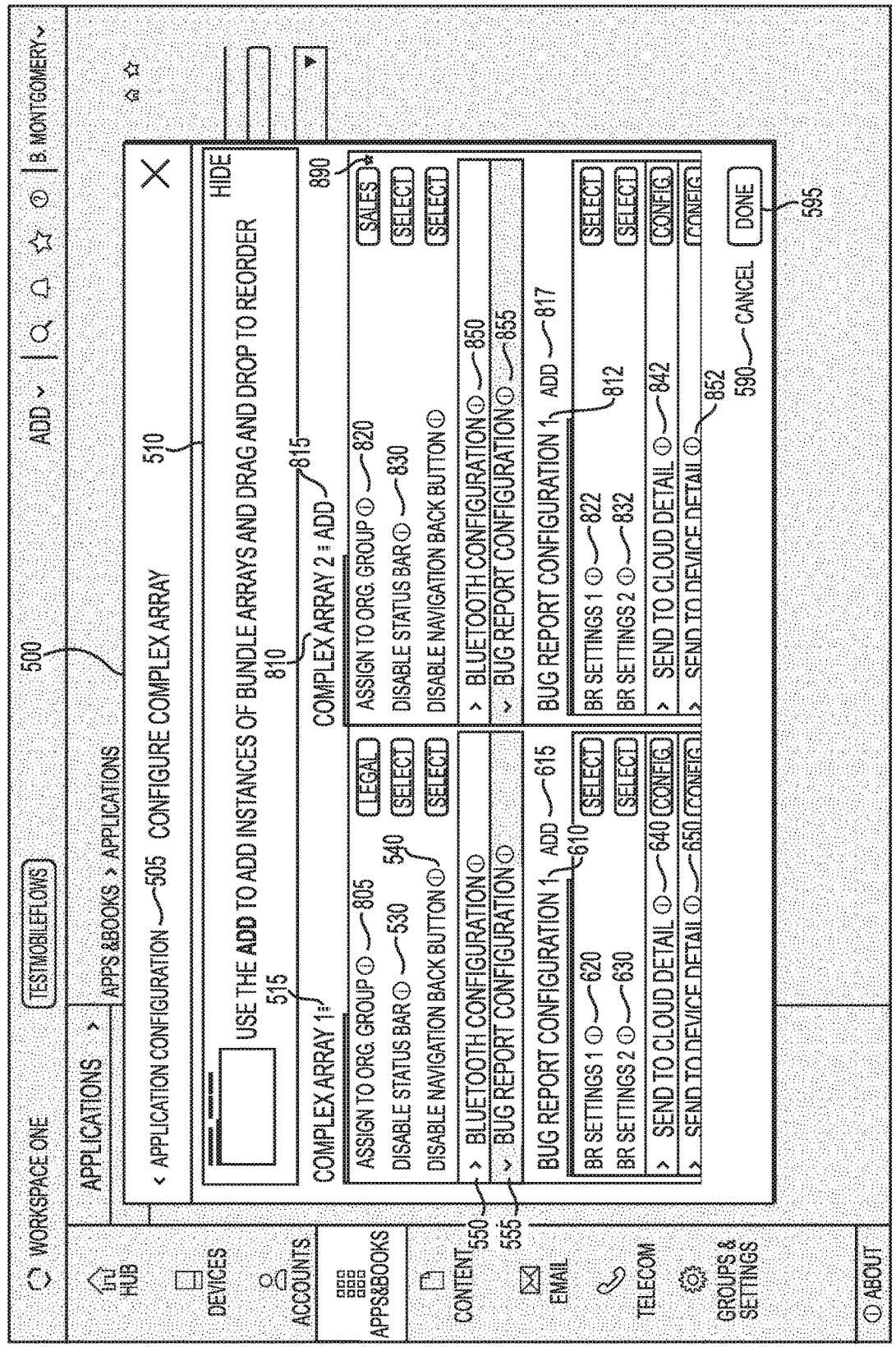
FIG. 8 is an illustration of an example GUI that supports complex arrays of configuration information for configuring user devices.

FIG. 8 shows another example of the GUI page 500 from FIGS. 5-7. While FIG. 7 depicts an example that displays one of multiple complex arrays at a time, with the ability to switch between those multiple arrays, FIG. 8 shows an example that displays multiple complex arrays at the same time. In this example, complex array 1 515 and complex array 2 810 are shown in a side-by-side configuration. This configuration allows an administrative user to view the content of two arrays at the same time, aiding in comparison between the two arrays and providing more information in a single view. An add button 815 remains, for adding additional arrays.

The portion of the GUI associated with complex array 2 810 includes similar fields as shown for complex array 1 515. For example, the GUI 500 includes a disable status bar option 830 that provides similar functionality as the disable status bar option 530 described previously. Similarly, the GUI 500 includes an option for disabling a navigation back button 840 that corresponds to option 540 described previously. The graphical elements 550 and 555 corresponding to lower-level arrays has also been copied and generated as graphical elements 850 and 855 in this example.

As shown in FIG. 8, the portion of the GUI 500 relating to complex array 2 810 also includes an expanded view of the bug-report lower-level array 812 corresponding to the bug-report lower-level array 610 of complex array 1 515. The portion of the GUI 500 relating to complex array 2 810 also includes add button 817, standalone settings 822 and 832, and "send to cloud detail" 842 and "send to device detail" 852 expandable arrays, all of which correspond to similar GUI elements displayed with respect to complex array 1 515.

FIG. 8 also depicts OG fields 805 and 820. Each OG field 805, 820 can allow an administrative user to assign a corresponding complex array 515, 810 to a specific organizational group. An organizational group can represent a group of devices 130 managed by the management server 110. An organizational group can correspond to a structure or hierarchy of a business or enterprise, such as an engineering team, accounting team, or marketing team. In other examples, the organization group can correspond to devices 130 located in a particular geographic area, such as office space, a public waiting room, a user's home, or even particular floors, rooms, or portions of a user's home.

An administrative user can select an organizational group for each complex array 515, 810, such that the corresponding group of settings is provided to user devices 130 belonging to the respective organizational group. In this example, complex array 1 515 has been assigned to the "legal" organizational group while complex array 2 810 has been assigned to the "sales" organizational group. The management server 110 can receive these settings and use them to apply them to relevant devices 130. For example, the management server 110 can identify all devices 130 assigned to users within the legal group and instruct those devices 130 to apply the settings indicated in complex array 1 515. Similarly, the management server 110 can identify all devices 130 assigned to users within the sales group and instruct those devices 130 to apply the settings indicated in complex array 2 810.

To further assist an administrative user in comparing and contrasting different complex arrays 515, 810, the GUI 500 can visually highlight differences between the different complex arrays 515, 810. In the example of FIG. 8, the visual highlighting is performed by placing an icon, asterisk, or badge next to a setting field that differs from a setting field in another complex array. For example, the selection of OG fields 805 and 820 differ between the two complex arrays 515, 810; therefore, a graphical element 890 is displayed next to the selection at field 820. In some examples, the graphical element is displayed next to both fields 805 and 820 to show the differences in both locations. Other visual displays may be used as well, such as by using a colored box surrounding an element or by highlighting the text of the element. This can allow an administrative user to easily detect the differences between different complex arrays 515, 810.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for configuring a complex array of configuration information on a graphical user interface ("GUI"), comprising:
    receiving, at the management server from an application repository, a schema file, wherein the schema file includes configuration options for the user device based on the device type;
    storing the schema file in a database accessible to the management server;
    displaying, on the GUI, a first top-level array of configuration fields described in the schema file, wherein the first top-level array comprises a plurality of graphical elements corresponding to a respective plurality of lower-level arrays of configuration options described in the schema file;
    in response to a selection of a first graphical element corresponding to a first of the plurality of second-level arrays:
        extracting lower-level configuration information from the schema file;
        generating a first lower-level array based on the extracted configuration information; and
        displaying, within the first top-level array, the first lower-level array of configuration fields comprising the extracted lower-level configuration information;
    receiving user input at a data field of the first lower-level array; and
    sending, from the management server to the user device, settings to be applied to the user device, wherein the settings reflect the user input at the data field of the first lower-level array.

2. The method of claim 1, further comprising:
    receiving, at the GUI, a user selection of a copy element corresponding to the first lower-level array; and
    in response to receiving the user selection of the copy element:
        generating a second lower-level array having configuration fields matching the configuration fields of the first lower-level array;
        retrieving, from the database, a file describing entries in the configuration fields of the first lower-level array; and automatically inputting the entries from the retrieved file into the configuration fields of the second lower-level array.

3. The method of claim 1, further comprising:
receiving, at the GUI, a user selection of a copy element corresponding to the first top-level array; and
in response to receiving the user selection of the copy element:
generating a second top-level array having configuration fields matching the configuration fields of the first top-level array and having a third lower-level array matching the first lower-level array of the first top-level array;
retrieving, from the database, a file describing entries in the configuration fields of the first top-level array; and
automatically inputting the entries from the retrieved file into the configuration fields of the second top-level array.

4. The method of claim 3, wherein automatically inputting the entries from the retrieved file into the configuration fields of the second top-level array includes automatically inputting the entries into the third lower-level array.

5. The method of claim 1, wherein user entries in the fields of the first top-level array and first lower-level array are stored at the database in a JSON file.

6. The method of claim 1, further comprising:
retrieving an updated schema file from the application repository; and
dynamically updating the GUI to reflect the updated schema file.

7. The method of claim 1, wherein the configuration options of the schema file are provided by an OEM of the user device.

8. A non-transitory, computer-readable medium containing instructions that, when executed by a hardware-based processor, performs stages for configuring a complex array of configuration information on a graphical user interface ("GUI"), the stages comprising:
receiving, at the management server from an application repository, a schema file, wherein the schema file includes configuration options for the user device based on the device type;
storing the schema file in a database accessible to the management server;
displaying, on the GUI, a first top-level array of configuration fields described in the schema file, wherein the first top-level array comprises a plurality of graphical elements corresponding to a respective plurality of lower-level arrays of configuration options described in the schema file;
in response to a selection of a first graphical element corresponding to a first of the plurality of second-level arrays:
extracting lower-level configuration information from the schema file;
generating a first lower-level array based on the extracted configuration information; and
displaying, within the first top-level array, the first lower-level array of configuration fields comprising the extracted lower-level configuration information;
receiving user input at a data field of the first lower-level array; and
sending, from the management server to the user device, settings to be applied to the user device, wherein the settings reflect the user input at the data field of the first lower-level array.

9. The non-transitory, computer-readable medium of claim 8, the stages further comprising:
receiving, at the GUI, a user selection of a copy element corresponding to the first lower-level array; and
in response to receiving the user selection of the copy element:
generating a second lower-level array having configuration fields matching the configuration fields of the first lower-level array;
retrieving, from the database, a file describing entries in the configuration fields of the first lower-level array; and
automatically inputting the entries from the retrieved file into the configuration fields of the second lower-level array.

10. The non-transitory, computer-readable medium of claim 8, the stages further comprising:
receiving, at the GUI, a user selection of a copy element corresponding to the first top-level array; and
in response to receiving the user selection of the copy element:
generating a second top-level array having configuration fields matching the configuration fields of the first top-level array and having a third lower-level array matching the first lower-level array of the first top-level array;
retrieving, from the database, a file describing entries in the configuration fields of the first top-level array; and
automatically inputting the entries from the retrieved file into the configuration fields of the second top-level array.

11. The non-transitory, computer-readable medium of claim 10, wherein automatically inputting the entries from the retrieved file into the configuration fields of the second top-level array includes automatically inputting the entries into the third lower-level array.

12. The non-transitory, computer-readable medium of claim 8, wherein user entries in the fields of the first top-level array and first lower-level array are stored at the database in a JSON file.

13. The non-transitory, computer-readable medium of claim 8, the stages further comprising:
retrieving an updated schema file from the application repository; and
dynamically updating the GUI to reflect the updated schema file.

14. The non-transitory, computer-readable medium of claim 8, wherein the configuration options of the schema file are provided by an OEM of the user device.

15. A system for configuring a complex array of configuration information on a graphical user interface ("GUI"), comprising:
a memory storage including a non-transitory, computer-readable medium comprising instructions; and
a computing device including a hardware-based processor that executes the instructions to carry out stages comprising:
receiving, at the management server from an application repository, a schema file, wherein the schema file includes configuration options for the user device based on the device type;
storing the schema file in a database accessible to the management server;
displaying, on the GUI, a first top-level array of configuration fields described in the schema file, wherein the first top-level array comprises a plurality of graphical elements corresponding to a respective plurality of lower-level arrays of configuration options described in the schema file;

in response to a selection of a first graphical element corresponding to a first of the plurality of second-level arrays:

extracting lower-level configuration information from the schema file;

generating a first lower-level array based on the extracted configuration information; and displaying, within the first top-level array, the first lower-level array of configuration fields comprising the extracted lower-level configuration information;

receiving user input at a data field of the first lower-level array; and sending, from the management server to the user device, settings to be applied to the user device, wherein the settings reflect the user input at the data field of the first lower-level array.

16. The system of claim 15, the stages further comprising:

receiving, at the GUI, a user selection of a copy element corresponding to the first lower-level array; and in response to receiving the user selection of the copy element:

generating a second lower-level array having configuration fields matching the configuration fields of the first lower-level array;

retrieving, from the database, a file describing entries in the configuration fields of the first lower-level array; and automatically inputting the entries from the retrieved file into the configuration fields of the second lower-level array.

17. The system of claim 15, the stages further comprising:

receiving, at the GUI, a user selection of a copy element corresponding to the first top-level array; and in response to receiving the user selection of the copy element:

generating a second top-level array having configuration fields matching the configuration fields of the first top-level array and having a third lower-level array matching the first lower-level array of the first top-level array;

retrieving, from the database, a file describing entries in the configuration fields of the first top-level array; and automatically inputting the entries from the retrieved file into the configuration fields of the second top-level array.

18. The system of claim 17, wherein automatically inputting the entries from the retrieved file into the configuration fields of the second top-level array includes automatically inputting the entries into the third lower-level array.

19. The system of claim 15, wherein user entries in the fields of the first top-level array and first lower-level array are stored at the database in a JSON file.

20. The system of claim 15, the stages further comprising:

retrieving an updated schema file from the application repository; and dynamically updating the GUI to reflect the updated schema file.

* * * * *